US009256654B2

(12) United States Patent
Spanton et al.

(10) Patent No.: US 9,256,654 B2
(45) Date of Patent: Feb. 9, 2016

(54) DYNAMIC SCHEMA CONTENT SERVER

(75) Inventors: Brian E. Spanton, Bellevue, WA (US); Raymond Arifianto, Sammamish, WA (US); James Coliz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1360 days.

(21) Appl. No.: 11/952,449

(22) Filed: Dec. 7, 2007

(65) Prior Publication Data

US 2009/0150423 A1 Jun. 11, 2009

(51) Int. Cl.
G06F 7/00 (2006.01)
G06F 17/30 (2006.01)

(52) U.S. Cl.
CPC .... *G06F 17/30557* (2013.01); *G06F 17/30292* (2013.01); *G06F 17/30604* (2013.01)

(58) Field of Classification Search
USPC .................. 707/793, 791, 790, 736, 802, 798
See application file for complete search history.

(56) References Cited

U.S. PATENT DOCUMENTS

| | | | |
|---|---|---|---|
| 5,737,736 A * | 4/1998 | Chang ................................. | 1/1 |
| 6,427,153 B2 * | 7/2002 | Nelson et al. ........................ | 1/1 |
| 6,553,563 B2 * | 4/2003 | Ambrose et al. .............. | 717/116 |
| 6,884,162 B2 | 4/2005 | Raverdy et al. .................... | 463/1 |
| 6,915,298 B1 * | 7/2005 | Cain et al. .............................. | 1/1 |
| 6,959,288 B1 | 10/2005 | Medina et al. ................... | 705/51 |
| 7,200,810 B2 | 4/2007 | Nitta et al. ..................... | 715/517 |
| 7,249,139 B2 | 7/2007 | Chuah et al. ................... | 707/102 |
| 7,571,091 B2 * | 8/2009 | Colley ............................ | 703/27 |
| 8,533,746 B2 * | 9/2013 | Nolan et al. ................... | 719/328 |
| 2001/0049606 A1 | 12/2001 | Lucarelli ........................... | 705/1 |
| 2001/0049686 A1 * | 12/2001 | Nelson et al. .............. | 707/103 X |
| 2003/0041053 A1 * | 2/2003 | Roth ................................. | 707/3 |
| 2003/0225774 A1 * | 12/2003 | Davidov et al. ............... | 707/100 |
| 2004/0015516 A1 * | 1/2004 | Harter et al. ................ | 707/104.1 |
| 2004/0053690 A1 * | 3/2004 | Fogel et al. ...................... | 463/31 |
| 2004/0093310 A1 | 5/2004 | Thomborson ................... | 705/75 |
| 2005/0060266 A1 | 3/2005 | DeMello et al. ................ | 705/57 |
| 2005/0097133 A1 * | 5/2005 | Pham et al. ................ | 707/104.1 |
| 2005/0120048 A1 * | 6/2005 | Venkatesh et al. ......... | 707/103 R |
| 2005/0203922 A1 * | 9/2005 | Uhlir et al. .................... | 707/100 |
| 2005/0246193 A1 | 11/2005 | Roever et al. ..................... | 705/1 |

(Continued)

OTHER PUBLICATIONS

Bossung, S. et al., "Open and Dynamic Schema Evolution in Content-Intensive Web Applications", *Proceedings of the Second International Conference on Web Information Systems and Technologies*, 2006, http://www.sts.tu-harbug.de, 109-116.

(Continued)

*Primary Examiner* — Eliyah S Harper
(74) *Attorney, Agent, or Firm* — Kevin Sullivan; Kate Drakos; Micky Minhas

(57) ABSTRACT

A method to develop a game using a networked content server includes an efficient method to add or modify a new object into the game environment. The method includes the generation of an XML input file describing the new object. The XML new object definition file is uploaded from a game developer client device to a content server. The content server automatically examines the XML input file and converts the definition file to an object type graph and then into a set of SQL instructions as well as a set of web methods. The content server automatically executes the SQL instructions to enter the new object into a database. Web methods corresponding to the new object and are provided to the client device for access to the new object. The game developer thus has nearly immediate access to the new object.

14 Claims, 5 Drawing Sheets

(56) References Cited

U.S. PATENT DOCUMENTS

| | | |
|---|---|---|
| 2006/0074942 A1* | 4/2006 | Shaburov .................... 707/100 |
| 2007/0094074 A1 | 4/2007 | Bodnar ........................ 705/14 |
| 2007/0174888 A1 | 7/2007 | Rubinstein .................. 725/115 |
| 2007/0180470 A1 | 8/2007 | Gill et al. ..................... 725/52 |
| 2007/0204078 A1 | 8/2007 | Boccon-Gibod et al. ..... 710/54 |
| 2008/0140698 A1* | 6/2008 | Lee et al. .................... 707/102 |
| 2008/0154916 A1* | 6/2008 | Atashband ................... 707/10 |
| 2008/0189240 A1* | 8/2008 | Mullins et al. ................. 707/2 |

OTHER PUBLICATIONS

Iannella, R., "On-Line Trading of Rights-Enabled Learning Objects", *International Journal of Electronic Commerce*, 2004, 8(4), 99-113.

"Metadata for Digital Libraries: A Research Agenda", http://www.ercim.org/publication/ws-proceedings/EU-NSF/metadata.html, Downloaded from Internet Sep. 26, 2007, 11 pages.

Arms, W., Chapter 4, "Innovation and Research", *Digital Libraries*, 1999, http://www.cs.cornell.edu, 14 pages.

* cited by examiner

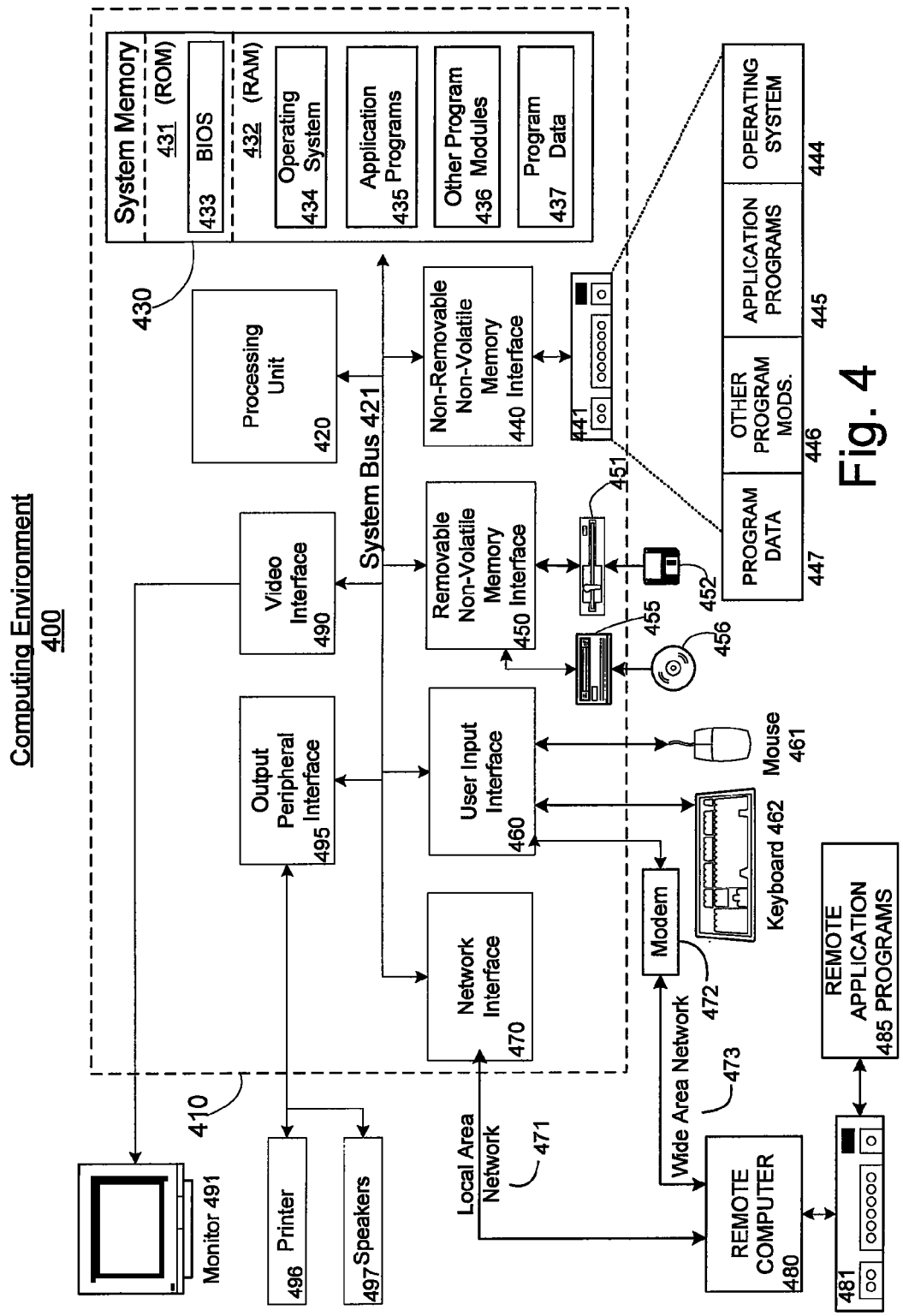

DYNAMIC SCHEMA CONTENT SERVER

BACKGROUND

The development of game software is a time-consuming process. Typically, a new game is developed for a given gaming platform such as XBox™ manufactured by Microsoft Corporation. The gaming platform manufacturer provides a software development kit (SDK) to game developers to start their new game development. The SDK contains application programming interfaces (APIs) that allow the game developers to access functionality of the gaming platform. Also provided may be basic physics, video, and audio packages that can control the movement, look, and sound of objects presented in a game for the gaming platform.

When a game developer decides to create a new object for a game, such as a new vehicle, or a new tool or weapon, the game developer contacts the gaming platform manufacturer and provides a description of the desired new object. Documentation for the new object is generated by the game developer and sent to the gaming platform manufacturer who then takes the new object description and generates the new object essentially manually. The new object, along with the supporting access APIs for the new object are then generated in a new build of the SDK. The next version of the SDK can then be provided to the game developer after the release of the new SDK build. This process can take weeks or more and much time can be lost in iterations of this process to develop the most desirable form for the new object. Thus, the development of new games for a new gaming platform can take as much as two years before a first version of the new game is available for public consumption.

It would be advantageous to reduce the time delay in developing new objects for games to be run on gaming platforms. A reduction in time delay and the removal of human intervention in new object development at the gaming platform manufacturer would likely result in greater efficiencies in game development activities, better utilization of human resources, and a shorter time to market for new games. The present invention addresses these concerns and others.

SUMMARY

In one aspect of the invention, a game developer need only submit a human readable input document, such as an XML input document or file, that describes a new object or object type or class that is desired to be added to a new game to be run on a gaming platform in order to automatically initiate the generation of the new object or object type or object class. The inventive system inputs the client-based game developer provided XML input description file and the system automatically creates the new object in a networked content server database. The game developer is then able to access the new object within minutes of the submittal of the XML input via a new library that includes the new object.

To create the new object, the XML file is automatically converted, at the content server, into a type graph and type graph abstraction. The type graph abstraction is then converted into a set of SQL statements that instruct a database management system (DBMS) of the content server to create the new object. In addition, web method procedures or RPC calls similar to web-based Application Programming Interfaces (APIs) that correspond to use of the new object in the gaming platform are generated and then sent from the content server to the client as part of an update to the software development kit used by the client to develop the new game for the gaming platform. This is a pre-production use of the aspects of the new method to develop new game software for a specific gaming platform.

The new features of the new gaming configuration can also be used post-production by game players. In this post-production aspect, game players can upload data objects, such as photos, video captures, game player developed vehicles, maps, and ratings and the like to the content server. An uploaded data object can be shared among all game players to enhance the game playing experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 4 is a block diagram showing an example host computing environment in which aspects of the invention may be implemented.

DETAILED DESCRIPTION

Exemplary Embodiments

Overview

Figure 1:
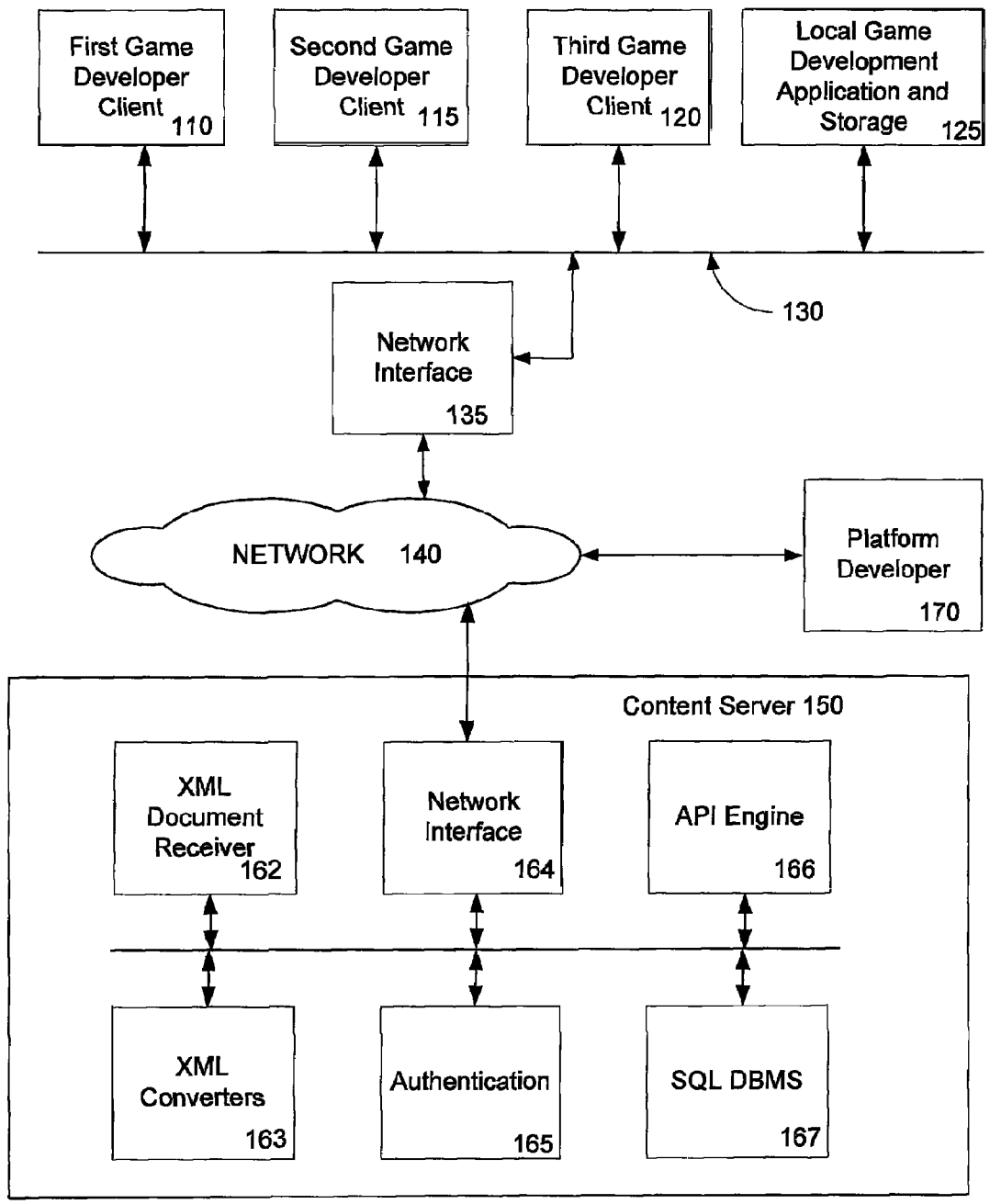
FIG. 1a is a block diagram showing a system for game development according to one embodiment.

FIG. 1 depicts aspects of the system and method for development of game software. Although the principles involved in the aspects to be discussed may be applied to any software development based on a platform core, one embodiment is the development of game software. FIG. 1 depicts a game development environment. In this environment, a first game developer 110, a second game developer 115, and a third game developer 120, are developing a game for use on a platform provided by a second party. The game software development is supported by the local game development application and storage function 125. Network 130, which may be a LAN, allows communication between the three game developers 110, 115, and 120, and the local game development software application and associated storage 125. Although a local network 130 is shown as a local network, one of skill in the art will recognize that other network topologies such as a wireless LAN or a WAN, public or private, such as an Intranet or the Internet is possible.

The local network 130 shown in FIG. 1 supports a network interface 135 that may interface to a larger network 140, such as an Intranet or the World Wide Web. Platform developer 170 is a network entity that represents the game platform generator. For Example, the game developers 110, 115, 120 can be developing a new game application that runs on a specific game platform such as PlayStation™ by Sony of New York or XBox™ by Microsoft of Washington. As an aspect of the current invention, the platform developer 170, (e.g. Microsoft Corporation) supplies the content server 150, also connected to network 140, which supports game application development for the game platform of interest, such as XBox™.

The game developers 110, 115, 120 can download base programs, such as physics programs, base layouts, and operational application programming interfaces (APIs) from the platform provider that assist in developing games that are compatible with the platform. In the example of FIG. 1, the platform developer provides and maintains the content server for this and other purposes. Thus, game developers can access the necessary tools and interfaces needed to design a new game application compliant with the rules and features of the game platform (e.g. Xbox).

As discussed briefly above, in the prior art, if game developers wanted to develop new objects for a platform, a new object would have to be formulated with the help of the platform developer. The new object description would have to be delivered or otherwise communicated to the platform developer, possibly via standard ground transportation-based package mail, and be implemented by the platform developer by hand. Then, after implementation of the new object, the platform developer would have to compile the new object and provide a new build of the game software development kit and issue it to the game developers 110, 115, and 120. This process takes a great deal of time where the game developers have to work without the desired new object.

In one aspect of an embodiment, a system and method supporting the efficient development of software for a game includes the use of a content server 150. The content server is a server device on the network 130 that is maintained by the platform developer for the benefit of the game developers 110, 115, 120. The content server 150 includes a network interface 164 allowing communications through the network 130 to other entities also on the network. Authentication block 165 is used to enforce a restricted access to content server files. For example, access to the content server would allow a user to search and acquire database objects via the SQL database 167 within the content server 150. The game development team may have access to objects and files that are related to their particular game and would be prevented from having access to files and objects belonging to another game development team.

In one aspect of the invention, a human-readable document or file, such as but not limited to an XML document or file is prepared at the game developer client 110, 115, 120 that describes a new object, a new object type, or a new object class. Generally, these three forms may be collectively referred to as a new object herein for the convenience of a reader skilled in the art. A new object, once created and stored in the content server database 167, can easily be shared by any of the game developers 110, 115, 120. Examples of a new object include photos, vehicles, maps or roads, background scenes, characters, tools for characters and players, or any custom-generated game feature. The XML document is prepared according to a schema that defines dynamic classes and queries. The document is sent over the network 130 from a game developer client to the content server 130.

The content server 150 receives the XML document via the network interface, and authenticates the user via the authentication block 165. The content server then receives the XML document 162 and validates and parses the XML description document. The XML converter block 163 of the content server 150 serves to perform several conversions. The first conversion is an XML to object type graph conversion. This conversion produces an object type graph corresponding to the XML document using the schema developed for the input document description of the object being generated. The result of first conversion is a type graph that serves as in input to a second conversion. The second conversion generates a set of SQL statements that will generate, modify, or delete tables in a SQL database. The second converter of the XML to SQL conversion is thus an object type graph to SQL statement converter. Another conversion is a type graph to web method procedures conversion which produces Remote Procedure Calls (RPCs) allowing the use of APIs so that the newly created object may be acquired via a web method.

The output of the type graph to SQL converter is a set of SQL instructions which load various tables within the SQL database that correspond to the new object. The new object is thus created and becomes part of the SQL database 167 as the SQL instructions are executed by the SQL DBMS 167. Although the new object is created and stored in the database as a result of the execution of the SQL instructions, the new object is useless to the game developers if the new object cannot be properly accessed. Therefore, hooks to the new object must be generated for the game developers use. The content server API engine 166 generates program hooks (i.e. Application Programming Interfaces) that can be used by a game developer client to access the new game object.

The API engine 166 inputs information related to the new object table generation by generating APIs that can be used by the game developers to access the new object. This set of APIs, automatically generated along with the automatic generation and execution of the SQL instructions, is assembled as part of a library of information for the game developers. Also provided in the library information are query standards so that the new object may be searched and retrieved using SQL queries against the Database 167. The library of information, containing the APIs that invoke the SQL queries in the content server is gathered into a new segment of a software development kit (SDK) update. This SDK update is given to the game developers for immediate use to search and utilize the new object and its corresponding functionality.

Thus, game developers, instead of waiting days or weeks for a new object to become functional in their prototype game, can use the fast turn-around aspects of the functionality of FIG. 1 to design, submit, and receive an updated SDK for their new object in a matter of minutes. This improvement in turn-around time increases game developer productivity and creativity because it allows near-real time creation and updates of game objects during game development.

As a consequence of this added capability to develop new game objects during the development of games, the same basic creation tool can be extended, in a game application form, to game players in post-production of the game. Some of the same aspects of the invention expressed herein are used to upload and share objects between players. Although the players are not granted permission to change the game, additional objects may be loaded by game players for game use.

In one aspect of the invention, the content server and the dynamic schema definition may be used by game players to share objects that relate to their game-play. For example, after the game is produced and sold to gamers, gamers can use aspects of the invention, such as the content server, to share information between the players. Examples of shared information include in-game photos taken by one of the players during a game play, video capture replays of events in a previous game play, vehicles that can optionally be used in a game, maps to help orient gamers to the playing field of the game world, ratings of any piece of data, or a collection of statistics concerning players, games played, downloaded, or rated.

Typically a game player is going to create a new object, such as a photo or a new vehicle via graphical user interface presented in the course of playing the actual game. Usually, the game developer has already written the code to take the player created object instance and encode it as values in a C++ structure. The game client provides libraries that then transform those C++ structures into serialized blobs of data suitable for transmission across the network to the content server. Once at the content server, the blob is deserialized into a runtime representation of an object instance of the types previously described and created in pre-production by the game developer. Then, the blob goes through a system that translates the in-memory representation into appropriate SQL commands to insert a row or rows into the table or tables previously generated by the developer using content server in pre-production. The whole process can be reversed for retrieving objects from the database for presentation in the game client. Thus, the one can also add functionality in the middle of that process, such as when the object is in memory on the content server, before or after being in SQL database, to add such features as content rating, or other modifications or processes.

XML Input Definition to Type Graph Conversion

Figure 2A:
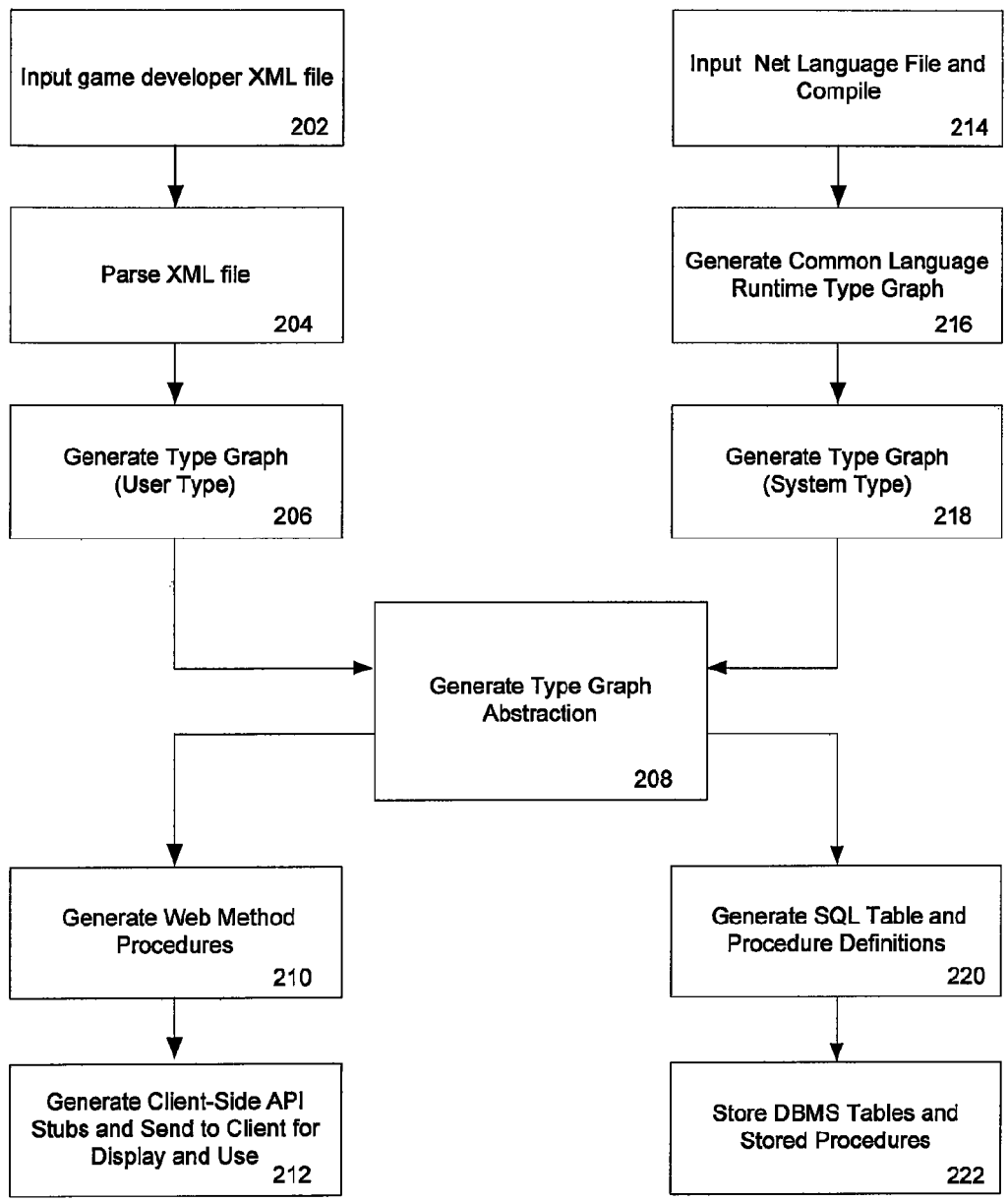
FIG. 2a depicts a flow diagram of components providing a type graph conversion and procedure generation according to aspects of the invention.

FIG. 2a depicts flow diagram 200 for the conversion of block 163 of FIG. 1. This conversion is an XML to object type graph conversion. Initially, an XML input, according to a dynamic schema is prepared by a client at step 202. The XML input from the game developer would include, according to the schema, a class of object that is to be created or modified, keywords for the object in the class, and characteristics or attributes concerning the object. An example set of XML schema inputs follow.

The following code provides are example embodiments of XML input file formats for the schema according to aspects of the invention. The name of each schema is provided below as the game name, "Gotham" and a descriptor for the schema. The Gotham Common Content Classes schema functions to enumerate content classes associated with Car Information, Replay of Car Information, and Description Information. The Gotham Photo Content schema serves to identify class and class members associated with Photos. The Gotham Replay content schema serves as a replay descriptor. The Gotham Ghost Content schema enumerates subclasses of the "ghost" name. In one embodiment, an XML Schema Definition (XSD) file is written to explicitly describe the rules that describe the new schema. One of skill in the art will realize that an XSD file may be needed to further process the XML schemas presented below.

```
<?xml version="1.0" ?>
- <schema xmlns:xsi="http://www.w3.org/2001/XMLSchema-
instance"xsi:noNamespaceSchemaLocation=
"file:///c:/sd/ts/v2/Platform/Server/App/DynamicSchema.xsd">
- <!--
    GOTHAM COMMON CONTENT CLASSES
-->
- <struct name="CarInfo">
    <enum class="VehicleType" size="8" />
    <enum class="Manufacturer" size="16" />
    <enum class="CarModel" size="16" />
    <enum class="Nationality" size="16" />
  </struct>
- <struct name="ReplayCarInfo">
    <enum class="VehicleType" size="8" />
    <enum class="Manufacturer" size="16" />
    <enum class="CarModel" size="16" />
    <enum class="Nationality" size="16" />
    <ulong name="Player" />
  </struct>
- <struct name="DescriptionInfo">
    <enum class="Location" size="16" />
    <enum class="Route" size="16" />
    <ulong name="Keywords1" />
    <ulong name="Keywords2" />
    <ulong name="Keywords3" />
    <enum class="RaceMode" size="16" />
  </struct>
- <!--
    GOTHAM PHOTO CONTENT
-->
- <class name="Photo" type="SystemType:Microsoft.GameStudios.
Content.Item, Microsoft.GameStudios.Content">
    <member type="CarInfo" />
    <member type="DescriptionInfo" />
    <binary name="Thumbnail" size="65536" />
  </class>
- <!--
    GOTHAM REPLAY CONTENT
-->
- <class name="Replay" type="SystemType:Microsoft.GameStudios.
Content.Item, Microsoft.GameStudios.Content">
    <guid name="Guid" />
  - <collection name="Cars">
    <member type="ReplayCarInfo" />
    </collection>
    <member type="DescriptionInfo" />
    <enum class="GameMode" size="8" />
    <int name="Microsoft.GameStudios.Tournaments.Tournament" />
    <int name="Microsoft.GameStudios.Tournaments.GameSession" />
  </class>
- <!--
    GOTHAM GHOST CONTENT
-->
- <class name="Ghost" type="SystemType:Microsoft.GameStudios.
Content.Item, Microsoft.GameStudios.Content">
    <enum class="GameMode" size="8" />
    <enum class="Route" size="16" />
    <enum class="ArcadeChapter" size="16" />
    <enum class="ArcadeEvent" size="16" />
    <enum class="VehicleType" size="8" />
    <enum class="VehicleClass" size="16" />
    <enum class="Model" size="16" />
    <float name="Score" />
  </class>
  </schema>
```

Returning to FIG. 2a, once the input XML is received at step 202, it is parsed at step 204 for syntax errors and user type. The user type graph is generated at step 206 and a type graph abstraction is generated at step 208. The user type graph abstraction may then be used to generate SQL code for the element or object being generated and web methods for use by game developers.

Figure 2B:
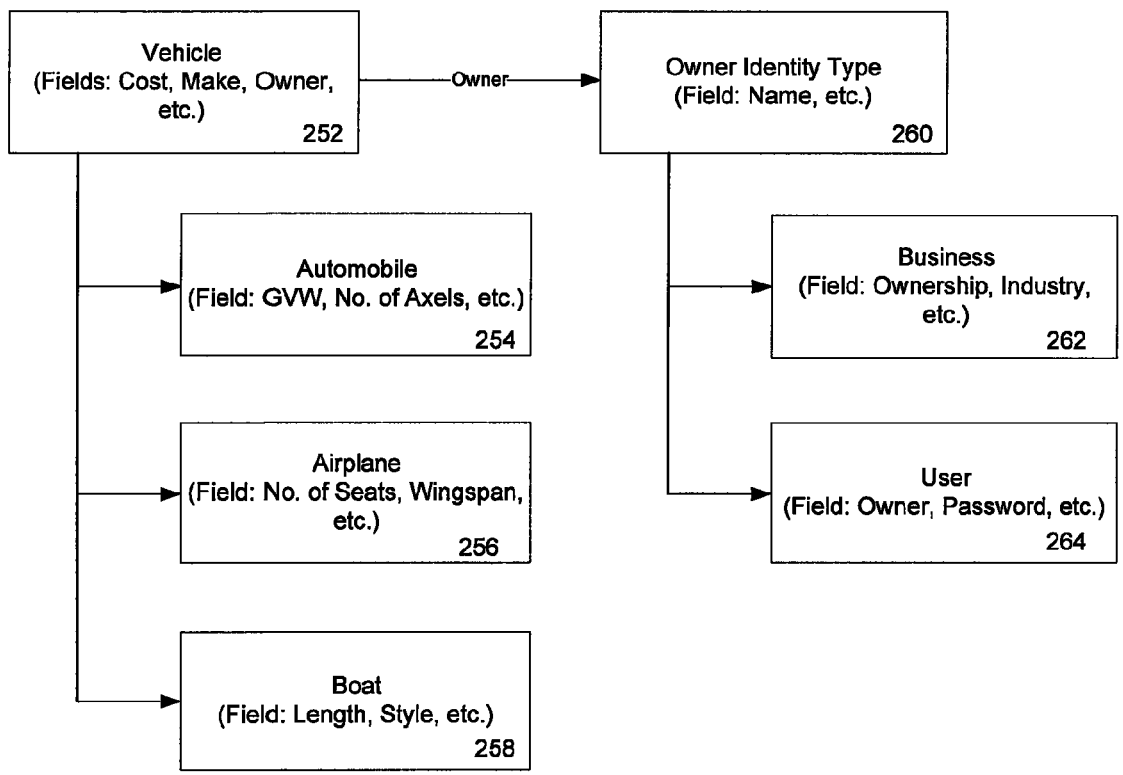
FIG. 2b is an example of type graphs.

As is well known by those of skill in the art, a type graph indicates the relationship between base classes, subclasses, and data member types. FIG. 2b illustrates an example type graph for a base class called vehicle 252, this base class has fields or attributes including cost, make owner, and the like. As part of a class inheritance, example vehicles include an automobile 254 having files or attributes of gross vehicle weight, number of axles, and the like. Another example vehicle is an airplane 256 having attributes of the number of seats, wingspan and the like. Yet another example of a vehicle is a boat 258 having the attributes of length, body style, and the like. As mentioned before, a vehicle 252 also has an ownership attribute. This ownership attribute has a "type" and may be referred to as a field type reference. In this instance the type is called an identity 260 which may include a field or attribute for a name, address, and the like. The identity 260 may have an inheritance tree which includes a business 262 where the ownership or the industry description may be attributes. Another example of identity type is a user 264 which may have attributes of owner, password, or other like attributes. FIG. 2b ia merely an example of a type graph for a base class named vehicle. Such type graphs exist in memory and, in relation to the present invention, are produced at steps 206 and 208 of FIG. 2a.

Returning to FIG. 2a, the generation of a type graph abstraction for a new object for the game under developments provides a useful mechanism to generate, in parallel, a DBMS object related to the XML definition provided via the input file at step 202, and a web method that may be used by a game developer. Using the example object type graph provided via step 208 above, the process 200 continues at step 220 with the following steps that define the object type to SQL statement conversion. As can be appreciated by one of skill in the art, although SQL or a relational database implementation (DBMS, RDBMS, etc.) is described, other database languages, and database forms, such as relational or non-relational, can be used equally well with all of the descriptions presented herein.

The type graph abstraction is used to generate SQL tables and procedure definitions at step 220 corresponding to the new object defined by the XML input file of step 202 and the type graph representation of step 208. In one embodiment, the SQL tables and procedure definition statements are generated as Transact-SQL (T-SQL) form. The tables and procedure statements generated are then executed at step 222 to create the new object defined via the XML input file of step 202.

In a parallel process, the abstraction of the type graph generated at step 208 is used at step 210 to generate web method procedures corresponding to the new object. Web methods are essentially remote procedure calls (RPCs) that define application programming interfaces (APIs) useful across the web to invoke action concerning the new object in the content server. The web method procedures are generated and are made available to the client via client—side API stub definitions at step 212. These client-side APIs allow the client to display and use the new object generated by the T-SQL instructions and made accessible via the web method procedures. In one embodiment, the client-side APIs behave like proxy stubs for client code to appear as a local client call, but in actuation produce RPC-like calls.

Also depicted in FIG. 2a is an input leg at steps 214, 216, and 218 that permit the construction of a system type graph from a .Net language file. In this path, the new object could be defined in a .NET language such as C#, and be input and compiled at step 214. The compiled .Net file cn them be converted to a common language runtime (CLR) type graph at step 216. The type graph is further defined as a system type graph at step 218 before being converted to an abstraction of a type graph at step 208. From there, the generation of the new objects is as before where the object itself is generated and stored in the DBMS via SQL statement generation, execution, and result storage via steps 220-222. The web method procedures are also automatically generated and provided to the client via steps 210-212 as described above.

In FIG. 1, the API Engine produces APIs and SQL search information resulting from the above referenced XML conversions to type graphs and the subsequent generation of new objects in a SQL DBMS and corresponding web methods. The APIs and SQL search information resulting from the API Engine operations produces a software development kit (SDK) update useful to the game developer which allows access to the newly created or modified object. In general, the SDK content includes the APIs corresponding to the SQL queries used by the game developer client device to access the DBMS tables containing the new or modified object in the content server 150. The client device uses the APIs provided in the SDK which invoke web methods. The web methods invoke the SQL statements which have been created and installed on the content server in order to access the new objects. It should be noted that developers typically modify only the type graph, and thus the tables and APIs during game development. However, during game play, a game player typically does not modify the type graph. Instead, a game player typically creates an actual instance of the types described by the type graph envisioned by the game developer. The type graph envisioned by the game developer becomes defined or is referenced in the parameters of the relevant APIs during game development. As a result of the definition during game development, the developed type graph is stored as rows in the tables of the type graph.

Game Development Process Flow

Figure 3:
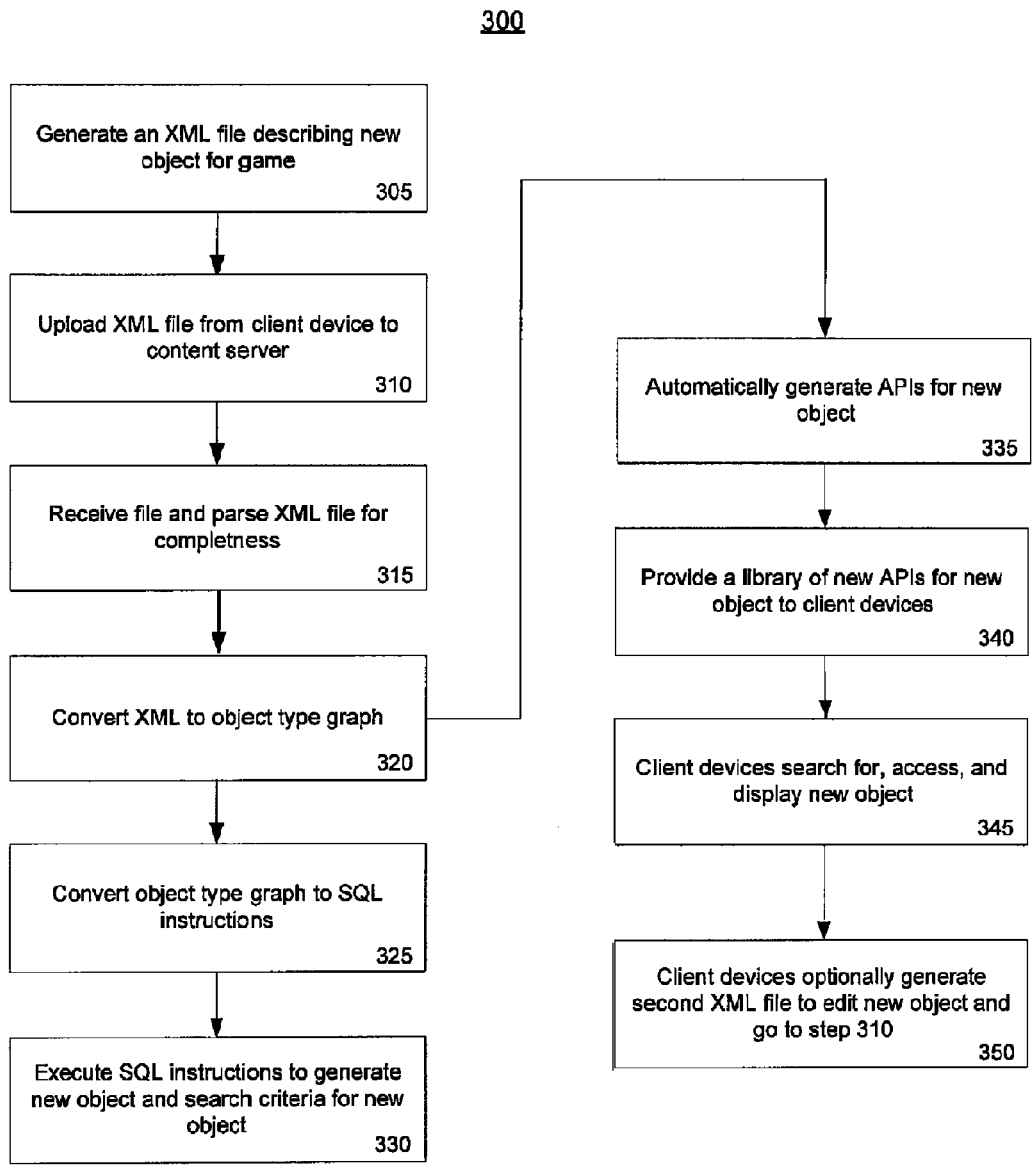
FIG. 3 is an example flow diagram depicting typical new object creation events according to aspects of the invention.

FIG. 3 depicts a flow diagram of a typical flow 300 of a game developer use of aspects of the invention. Although expressed in terms of a game developer standpoint where a game developer is developing a new game for an existing platform, the steps of process 300 are equally well suited for sharing of game object between game player after the game is fully produced and sold. In the latter case, the game player may develop of share an object using the content server in a fashion similar to that shown in FIG. 3, but with greater restriction to prevent alteration of the basic rules and standards of the game. In the instance of a game player using the procedure of FIG. 3, the new or modified object described in the XML file is intended to be shared among players and is an object representative of the use of the game. Examples of the XML file produced by a game player include items such as an in-game photo, a replay of game play video capture, a user-constructed vehicle or tool used for game play, a map of the route of a game, ratings of any piece of data associated with a game, and statistics on any feature of the game or players.

Returning to FIG. 3, initially, a game developer generates an XML file describing the new object to be created for the game platform at step 305. Alternatively, the game developer may desire to modify an existing game object and may submit an XML document describing the modified game object or the game object to be deleted. The generated XML file is uploaded via a network to the content server from the game developer client server in step 310.

The received XML file is received by the content server, parsed, and examined for completeness at step 315. Here, the parsing and examination includes a detection to ensure that all necessary elements of the XML file are compliant with the dynamic schema which is used as a format for generating an XML input file. For example, the XML input file must comply to the schema which may include such elements as the class and type of object, an object name, and other attributes useful to either define the object or useful to search for the object. Search elements may include the date of object creation, the author, and the game and version identification. Attributes for object operation may include characteristics of the object and limitations on object use.

Once the input XML file is checked for completeness, a conversion from XML to an object type graph is performed at step 320. This step is further explained via FIG. 2a of the present application as presented herein. At this point, two paths are taken. One path, including steps 325 and 330 generate the new object in accordance with the type graph produced in step 320. The other path, steps 335-345 generates APIs and other useful elements to enable game developers to use the new objected created from the input XML file. Now following the generation of the object in the content server, after an object type graph is acquired in step 320, a conversion is performed in step 325 from an object type graph to a set of SQL instructions. This conversion automatically generates SQL instructions needed to realize new or updated tables and search instructions for the new or modified object in the DBMS of the content server. The SQL instructions are then automatically executed at step 330 in the content server SQL DBMS so that tables, indexes on tables, and queries are generated relating to the new or modified object. At this point, the XML input file defining the new object has been realized in multiple tables in a SQL database associated with the content server for the specific game platform that the game developers are using.

Following the API generation path, after generation of the object type graph of step 320, application programming interfaces (APIs) relating to the use of the new or modified object are automatically generated at step 335. These APIs are related to web methods which allow APIs to be used as part of remote procedure calls (RPCs) which can invoke a call for the newly generated object. These newly assembled APIs and RPCs, along with search references for the new objects, are assembled into a library at step 340. This library constitutes an updated software development kit (SDK) that is immediately (within minutes of receiving the input XML file) downloaded to the client device over a network. This updated SDK can now be used to search for the new or modified object, using the search terms provided in the SDK in step 345. In using the automatically generated APIs and RPCs for the new object, a user essentially invokes the web methods, which include invoking of the SQL instructions and statements for accessing the new object already stored on the DBMS of the content server. Use of the updated SDK features results in a display of the new or modified object at the game developer client device.

Using the features of the process 200 allows game developers a capability to create new objects via an XML schema and submit an XML input file. The newly created object is then made available in minutes instead of days or weeks. The time saving alone in game development represents an advance over prior art processes for new object creation in a game development based on a gaming platform. This greatly reduced turn-around time for new object also allows a game developer to quickly make modifications to any object in the game environment. For example, in step 350 of FIG. 3, the game developer, at a client device can now access the newly created object and generate modifications via a second XML input file. This new input file can then be loaded into the content server from the client device at step 310. The process then can automatically proceed through the multiple conversion processes, automatically execute new SQL instructions for the modified object, generate APIs, RPCs and SQL queries for the new object and a new library and SDK will be delivered to the client device so that the game developer can access his modified object within minutes.

Exemplary Computing Device

FIG. 4 and the following discussion are intended to provide a brief general description of host computer suitable for either a client device or a content server. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), server computers, hand-held or laptop devices, multi-processor systems, microprocessor-based systems, programmable consumer electronics, network PCs, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system for implementing an example host computer includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures.

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 433, application programs 435, other program modules 436, and program data 437.

The computer system 410 may also include other removable/non-removable, volatile/nonvolatile computer storage media. By way of example only, FIG. 4 illustrates a hard disk drive 431 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 444, application programs 445, other program modules 446, and program data 447. Operating system 444, application programs 445, other program modules 446, and program data 447 are given different numbers here to illustrate that, at a minimum, they are different copies.

A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from MICROSOFT Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for quickly realizing a new object in a game environment. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method comprising:
automatically generating in a content server, without human intervention, a new object type described in a first XML file, the first XML file comprising information pertaining to game software development regarding a plurality of client devices, the automatic generating comprising:
converting the first XML file into a user type graph;
converting the user type graph into a type graph abstraction, the type graph abstraction permitting executing of two object type generation processes in parallel, each of the two object type generation processes useable for generating the new object type for inclusion in the game, the executing in parallel comprising:
executing a first process comprising:
generating from the type graph abstraction at least one structured query language (SQL) table and at least one procedure definition;
executing the at least one SQL table and the at least one procedure definition for generating the new object type; and
storing the new object type in a database of the content server;
executing a second process in parallel with the first process, the second process comprising generating from the type graph abstraction, at least one client-side application programming interface (API) that allows access of the new object type stored in the database, wherein the access is executable via a web method procedure;
automatically creating a library of information comprising the at least one client-side API; and
updating a software development kit (SDK) by inserting the library of information into the SDK.

2. The method of claim 1, further comprising editing the new object type in the database using, by the content server, a second XML file, the second XML file comprising information pertaining to game software development regarding the plurality of client devices.

3. The method of claim 1, wherein generating the first XML file comprises using a schema.

4. The method of claim 3, wherein the schema includes a definition of the new object type as well as search criteria for the new object type.

5. The method of claim 1, wherein the at least one SQL table comprises Transact-SQL instructions.

6. The method of claim 5, further comprising executing the Transact-SQL instructions via a database managements system (DBMS).

7. The method of claim 6, further comprising storing the at least one SQL table in a database of the DBMS located in the content server.

8. A content server comprising:
a processor coupled with a memory, the memory having stored thereon executable instructions that when executed by a processor cause the processor to effectuate operations comprising automatically generating, without human intervention, a new object type described in a first XML file, the first XML file comprising information pertaining to game software development regarding a plurality of client devices, the automatically generating comprising:
converting the first XML file into a user type graph;
converting the user type graph into a type graph abstraction, the type graph abstraction permitting executing of two object type generation processes in parallel, each of the two object type generation processes useable for generating the new object type for inclusion in the game, the executing in parallel comprising:
executing a first process comprising:
generating from the type graph abstraction, at least one structured query language (SQL) table and at least one procedure definition;
executing the at least one SQL table and the at least one procedure definition for generating the new object type; and
storing the new object type in a database of the content server;
executing a second process in parallel with the first process, the second process comprising generating from the type graph abstraction at least one client-side application programming interface (API) that allows access of the new object stored in the database, wherein the access is executable via a web method procedure;
automatically creating a library of information comprising the at least one client-side API; and
updating a software development kit (SDK) by inserting the library of information into the SDK.

9. The content server of claim 8, further comprising a display wherein a user of the plurality of client devices may view the new object type after using the library of information transmitted by the content server to the plurality of client devices to enable the development of game software.

10. The content server of claim 9, wherein the library of information is inserted into a software development kit update that is provided to the user of the plurality of client devices for additional development of game software.

11. A computer-read able storage medium that is not a signal, the computer-readable storage medium having computer-executable instructions for sharing objects in a client-server architecture, the instructions comprising:
automatically generating in a content server, without human intervention, a new object type described in a first XML file for inclusion in a game, the first XML file comprising information pertaining to game software development regarding a plurality of client devices, the automatic generating comprising:
converting the first XML file into a user type graph;
converting the user type graph into a type graph abstraction, the type graph abstraction permitting executing of two object type generation processes in parallel, each of the two object type generation processes useable for generating the new object type for inclusion in the game, the executing in parallel comprising:
executing a first process comprising:
generating from the type graph abstraction, at least one structured query language (SQL) table and at least one procedure definition;
executing the at least one SQL table and the at least one procedure definition for generating the new object type; and
storing the new object type in a database of the content server; and
executing a second process in parallel with the first process, the second process comprising generating from the type graph abstraction at least one client-side application programming interface (API) that allows access of the new object type stored in the database, wherein the access is executable via a web method procedure;

automatically creating a library of information comprising the at least one client-side API; and updating a software development kit (SDK) by inserting the library of information into the SDK.

12. The computer-readable storage medium of claim 11, wherein the at least one SQL table comprises Transact-SQL instructions.

13. The computer-readable storage medium of claim 12, further comprising executing the Transact-SQL instructions via a database managements system (DBMS).

14. A computer-readable storage medium of claim 13, further comprising storing at least one SQL table in a database of the DBMS located in the content server.

* * * * *